United States Patent [19]

Maple et al.

[11] 4,257,629
[45] Mar. 24, 1981

[54] FLEXIBLE CONDUIT REPAIR COUPLING

[75] Inventors: Steven E. Maple, Claremont; Enric C. Mendoza, Baldwin Park, both of Calif.

[73] Assignee: Rain Bird Sprinkler Mfg. Corp., Calif.

[21] Appl. No.: 901,528

[22] Filed: May 1, 1978

[51] Int. Cl.³ .............................................. F16L 25/00
[52] U.S. Cl. ...................................... 285/12; 285/177; 285/249; 285/323
[58] Field of Search ................. 285/12, 248, 249, 255, 285/322, 323, 177, 382.7, 324, 15; 403/334, 361; 279/48, 49, 56

[56] References Cited

U.S. PATENT DOCUMENTS

| 1,428,949 | 9/1922 | Eastman | 285/249 |
| 1,496,708 | 6/1924 | Gottsch | 285/177 X |
| 2,460,653 | 2/1949 | Roybould | 285/249 |
| 3,606,396 | 9/1971 | Prosdolimo et al. | 285/249 X |
| 3,649,050 | 3/1972 | Woodling | 285/12 |
| 3,980,325 | 9/1976 | Robertson | 285/249 |

FOREIGN PATENT DOCUMENTS 2166330  9/1973  Fed. Rep. of Germany .......... 285/177

Primary Examiner—Dave W. Arola
Attorney, Agent, or Firm—Fulwider, Patton, Rieber, Lee & Utecht

[57] ABSTRACT

A coupling is provided for the repair of flexible conduit, such as garden hose, comprising a body portion having at least one nipple for insertion into the free end of the flexible conduit. A slotted collapsible collet is radially compressed by a retaining nut thereby clamping the conduit between the nipple and the collet. The collet is generally frustoconical in shape and is reversible for retaining one size of conduit when disposed in a first direction and a larger size conduit when reversed. In order to accommodate a still larger conduit, the collet can be omitted. The body can include a second nipple which can be similarly attached to the free end of a conduit to effect repair of the conduit. Alternatively, the body can include a male or female fitting, a pair of which can be joined to effect repair of a conduit, or used separately in connection with other suitable fittings, as desired.

19 Claims, 8 Drawing Figures

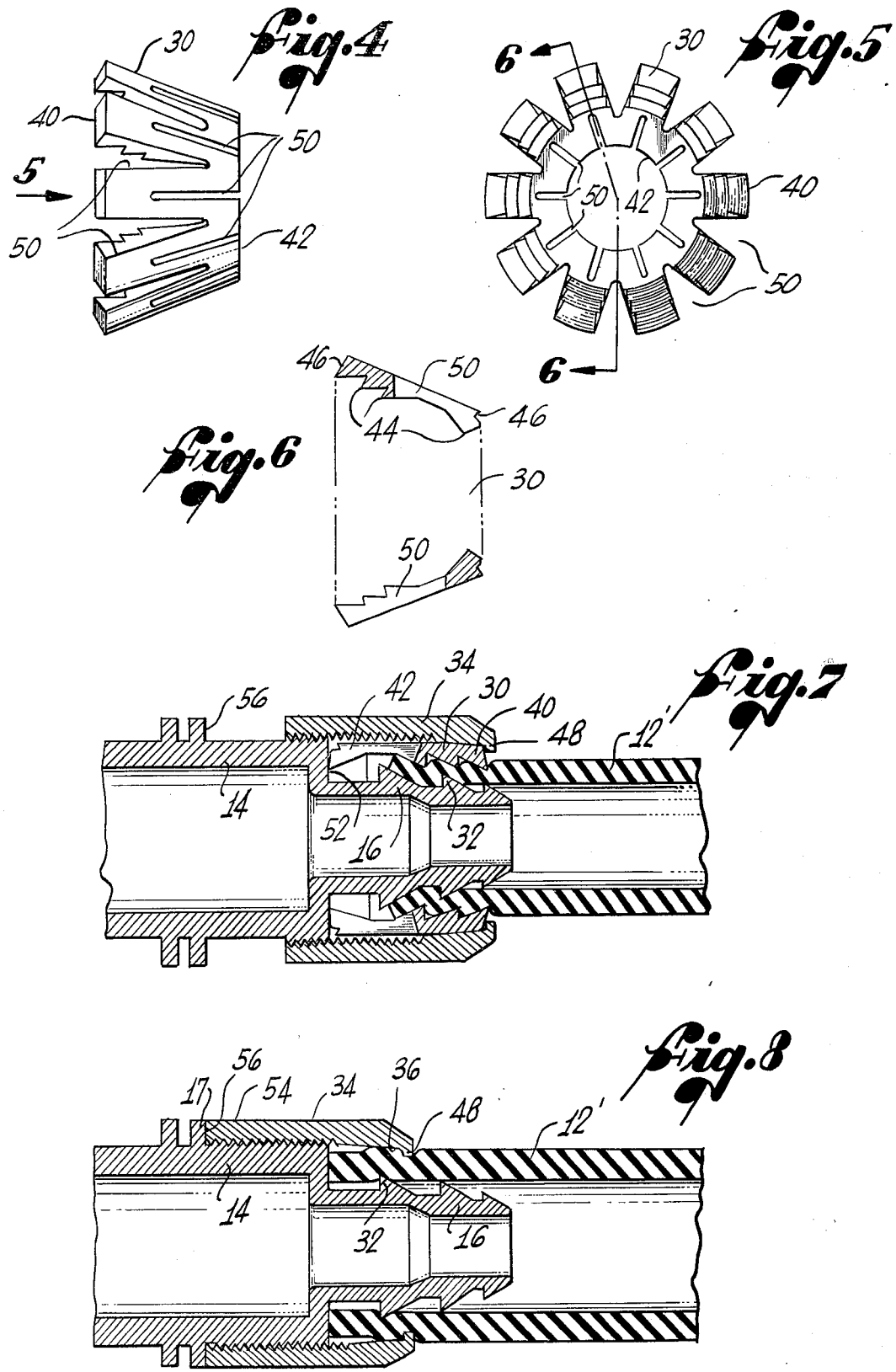

FLEXIBLE CONDUIT REPAIR COUPLING

BACKGROUND OF THE INVENTION

This invention relates generally to repair couplings for flexible conduits such as common garden hoses and the like, and, more particularly, to a single repair coupling which can be used in connection with a variety of different diameter sizes of such conduit.

Garden hose and other similar flexible conduits are subject to occasional failure, as by rupturing, splitting or cracking, and occasionally by externally induced damage. Further, damage often occurs to only one end of a hose, such as by galling the threads of a coupling or by crushing one end by driving over it with a vehicle. In order to avoid the necessity of having to discard an entire hose merely because of one small failure, repair couplings have been provided by which a length of the hose containing the damaged portion can be removed, and the resulting two free ends of the hose can be joined, thereby restoring the hose to a condition for useful service. Where only one end has been damaged, the hose can be repaired by severing the damaged coupling and securing the desired type of coupling to the resulting free end of the conduit.

Many repair couplings which have been provided for this purpose have included a body portion having a nipple arranged to be received in a free end of the conduit and a nut threadably received on the body portion for clamping the conduit between the nut and the nipple. Some of these couplings included an annular collet disposed between the nut and the conduit for sealingly clamping the conduit to the nipple. Several such prior art couplings are shown, for example, in U.S. Pat. Nos. 2,460,653, 3,606,396 and 3,649,050.

Although these couplings function in a generally satisfactory manner, in order to repair conduit of different diameter sizes, a separate repair coupling must be provided for each distinct size of conduit, or in some cases, one coupling body and nut is provided having several different sizes of collets. In the latter case, the proper collet must be selected by the user, and the unused collets are discarded, resulting in unnecessary expense of manufacture and waste by the user.

Accordingly, there has existed a need for a convenient and effective device for coupling the free ends of a flexible conduit which is relatively inexpensive to manufacture and is capable of joining several different diameter sizes of conduit without requiring excessive numbers of parts. As will become apparent from the following, the present invention satisfies that need.

SUMMARY OF THE INVENTION

The present invention resides in a new and improved repair coupling by which a flexible conduit is sealingly clamped between a nipple on the coupling body and an annular collet held in place by a retaining nut threaded on the body, and a variety of sizes of flexible conduit can be securely joined together by selectively arranging the collet in a first or second, oppositely facing position, or omitting the collet entirely. Moreover, the coupling of the present invention is relatively inexpensive to manufacture, is trouble-free and reliable in use, and provides a tight fluid seal on a variety of sizes of conduits while requiring production of a minimum of parts.

More specifically, the coupling of the present invention includes a body portion having at least one nipple projecting therefrom which is arranged to be tightly received in a free end of a flexible conduit. In order to fit tightly within conduits having various predetermined inside diameters, the nipple includes a series of external annular ribs of different outside diameters. The smallest of these ribs is arranged at the distal end of the nipple, and the largest is adjacent the body portion.

For clamping the conduit or hose to the nipple, a collapsible collet is provided coaxially surrounding the conduit and nipple, and the collet is compressed radially inwardly by a tapered bore on the inside of a retaining nut which coaxially surrounds the collet, and is threadably received on the body portion. The collet is generally frustoconical in shape and thereby arranged to engage a relatively small conduit when disposed in a first position and a larger conduit when reversed to assume a second position. For engaging a still larger conduit, the collet can be omitted from the coupling, and the conduit can be received over the largest of the annular ribs on the nipple, and sealingly clamped thereto by the retaining nut.

In order to achieve the collapsible characteristic of the collet, axial slots are provided in the collet projecting axially inwardly from opposite ends thereof at alternate intervals. If desired, the slots may extend more than half of the length of the collet and overlap one another in the central portion of the collet.

In order to securely join two free ends of a conduit, thereby effecting repair of the conduit, the body portion can be formed with two such nipples. Alternatively, the body portion can be formed with a nipple at one end and either a male or female fitting at the other end which fittings can be joined to effect repair of the conduit, or used separately in connection with other suitable fittings, as desired.

Other features and advantages of the present invention will become apparent from the following detailed description, taken in conjunction with the accompanying drawings, which illustrate, by way of example, the principles of the invention.

BRIEF DESCRIPTION OF THE DRAWINGS

FIG. 4 is a front elevational view of a collet employed in the coupling of the present invention;

FIG. 5 is an end view of the collet of FIG. 4 taken generally in the direction of line 5 of FIG. 4;

FIG. 6 is a cross-sectional view of the collet taken generally along lines 6—6 of FIG. 5;

FIG. 7 is a fragmentary, cross-sectional view of a coupling, similar to the view in FIG. 1, and illustrated assembled upon a conduit having a slightly larger inside diameter; and FIG. 8 is a fragmentary, cross-sectional view of a coupling, similar to the view of FIG. 7, and illustrated assembled upon a conduit having a still larger inside diameter.

DETAILED DESCRIPTION

Figure 1:
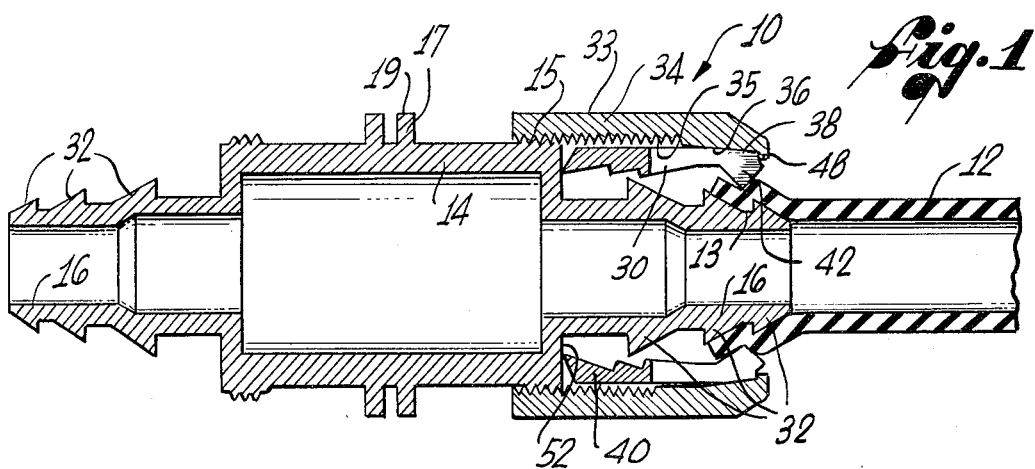
FIG. 1 is a cross-sectional view of a repair coupling embodying the present invention, having a body portion arranged with two oppositely facing nipples, and illustrated with a flexible conduit having a relatively small inside diameter assembled upon one of the nipples.

As shown in the exemplary drawings, the present invention is embodied in a coupling for repairing a flexible conduit such as common garden hose and the like. The coupling, indicated generally by reference numeral 10 in FIG. 1, is used for joining the free ends of a conduit 12 which may have been severed for the purpose of removing a damaged portion of the conduit. The coupling includes a body portion 14 having a pair of oppositely facing nipples 16 extending therefrom to which the conduit 12 is secured in a manner which will be described in greater detail later. It will be understood that, in order to effect repair of the conduit 12, a free end of the conduit is secured to each of the nipples 16 in substantially the same manner, but for simplicity of description, the conduit 12 is illustrated secured only to one side of the body portion 14.

Figure 2:
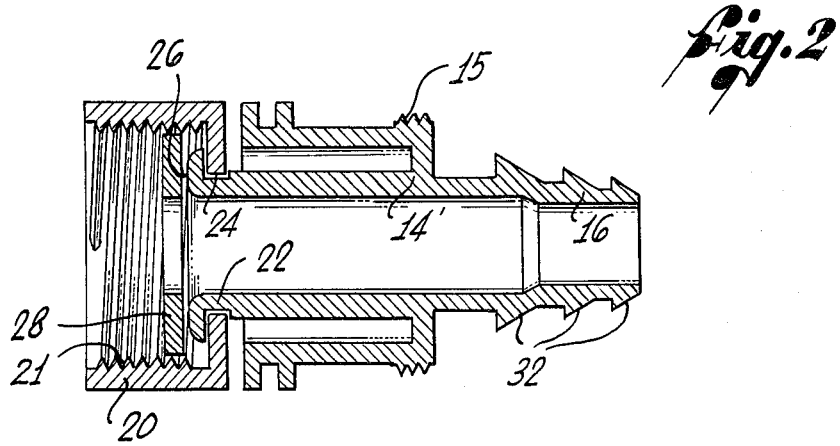
FIG. 2 is a cross-sectional view of a body portion of an alternative embodiment of the present invention, and illustrated arranged with a female fitting.
Figure 3:
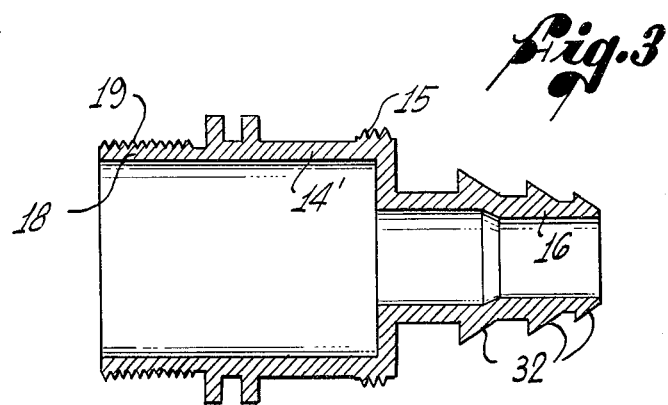
FIG. 3 is a cross-sectional view of a body portion of an alternative embodiment of the present invention, and illustrated arranged with a male fitting.

In an alternative embodiment of the present invention, in order to join the free ends of the conduit 12, a pair of couplings 10 are employed, one arranged with a male fitting 18 (FIG. 3) and the other arranged with a female fitting 20 (FIG. 2), which cooperate with each other to releasably connect the free ends of the conduit 12. Toward this end, the male fitting 18 is provided with external threads 19, and the female fitting 20 is provided with cooperating internal threads 21 which are preferably of a standard size in the field for which the coupling 10 is intended. By this arrangement, the free ends of the conduit 12 can be sealingly joined with each other, or with any other suitable fitting, as desired. Further, if the damage which is being repaired occurred at or near one end of the conduit, the user can elect simply to sever the damaged end and secure a coupling of the present invention arranged with either a male or female fitting to the free end of the conduit.

The male fitting 18 is preferably formed integrally with the body portion 14', and the female fitting 20 is rotatably mounted on a tubular extention 22 of the body portion 14'. The extention 22 projects through an opening 24 in the female fitting 20, and is mechanically flared to a greater diameter than the opening 24, thereby capturing the female fitting 20 and simultaneously forming a rounded surface 26 upon which a rubber washer 28, or other sealing means, can seat to form a tight fluid seal between the fittings. Sufficient clearance must be maintained between the opening 24 and the tubular extention 22 for permitting the female fitting 20 to rotate freely with respect to the body portion 14'.

As is well known in the art, commonly used flexible conduits are generally supplied in standard sizes, usually determined by the inside diameter of the conduit. For example, ordinary garden hose is normally supplied having an inside diameter of either one-half of an inch, five-eighths of an inch or three-quarters of an inch.

In accordance with the present invention, a repair coupling is provided which is capable of use in connection with a variety of sizes of conduits by selectively disposing a reversible collapsible collet 30 over the conduit in a first direction for a smaller size conduit, a second direction for a medium size conduit, and assembling the coupling without the collet to accommodate a large size conduit. Further, the coupling 10 of the present invention is relatively inexpensive to manufacture, is trouble free and reliable in use, and provides a tight fluid seal on a variety of sizes of conduits without requiring production of an excessive number of parts.

In order to fit tightly within a variety of sizes of conduits, the nipple 16 is provided with a series of external ribs 32 of different outside diameters. The ribs are preferably formed in a sawtooth shape having a relatively sharp edge disposed toward the body portion 14, and the ribs are arranged so that the rib having the smallest outside diameter is adjacent the distal end of the nipple 16, and each successive rib moving toward the body portion has a slightly greater outside diameter. In this way, the rib having the greatest outside diameter is adjacent the proximal end of the nipple 16, and each of the ribs can be sized to accommodate standard sizes of conduits commonly used in the field for which the coupling 10 is intended.

For securing the conduit 12 to the coupling 10, the nipple 16 is inserted into a free end of the conduit so that the conduit overlies at least one of the annular ribs 32. The collapsible collet 30 is then positioned surrounding both the nipple 16 and the end of the conduit 12, and radially compressed into the conduit by a retaining nut 34. For this purpose, the retaining nut 34 has an internally threaded portion 35 which threadably engages corresponding external threads 15 on the body portion 14, and includes an internal tapered bore 36 which bears on the outer surface 38 of the collet 30 forcing the collet to be compressed radially inwardly. In this way, the conduit 12 is clamped between the collet 30 and nipple 16, forcing the inside surface 13 of the conduit 12 to be compressed over at least one of the annular ribs 32 and forming a tight fluid seal between the conduit 12 and the coupling 10.

The coupling of the present invention is particularly well suited for assembly by hand, without requiring the use of any tools. Toward this end, to facilitate relative rotation between the body portion 14 and the nut 34, a radially extending flange 17 is provided on the body portion 14. The outer surface 19 of the flange 17, and the outer surface 33 of the nut 34, are formed with any suitable grip-enhancing configuration such as knurling or circumferentially concave scallops (not shown). By this arrangement, the body portion 14 can easily be held in a fixed position during manual tightening or loosening of the nut 34.

To accommodate different sizes of conduits 12, the collet 30 is generally frustoconical in shape (FIG. 4), having a large end 40 and a small end 42, and can be reversed so that either the large or small end is urged into engagement with the conduit. Each end of the collet is provided with at least one internal annular rib 44 (FIG. 6) for grippingly engaging the conduit 12, and a notch or stop 46 for cooperating with a lip 48 (FIGS. 1 and 7) on the retaining nut 34.

Further, as can best be seen in FIGS. 4, 5 and 6, the collet 30 includes axially disposed slots 50 at each end which are alternately arranged to permit the radial compression of the collet when assembled on the conduit 12. Preferably, the slots 50 extend more than one half of the length of the collet 30, overlapping each other, in order to enhance the flexibility of the collet.

When in use in connection with a relatively small diameter conduit 12 such as, for example one half inch hose, as can best be seen in FIG. 1, the coupling 10 is assembled as described above with the conduit overlying only the outermost rib 32 of the nipple 16, and clamped thereto by the small end 42 of the collet 30. The large end 40 of the collet bears against a shoulder 52 on the body portion 14 for preventing overtightening of the nut 34.

In order to accommodate a larger conduit 12' such as a five eighths inch hose, as can best be seen in FIG. 7, the collet 30 is reversed so that the large end 40 overlies the end of the conduit 12' and the small end 42 abuts the shoulder 52. Also, the larger conduit 12' fits over more of the nipple 16 and engages one of the larger ribs 32.

For securing the coupling 10 to a still larger conduit 12' such as a three quarter inch hose, the retaining nut 34 is placed over the free end of the conduit, and the nipple 16 is inserted into the conduit until the end of the conduit overlies the largest of the ribs 32 adjacent the body portion 14 (FIG. 8). The retaining nut 34 is then threaded onto the body portion 14 clamping the conduit 12' between the tapered bore 36 and lip 48 of the nut, and the largest rib 32 on the nipple 16. For preventing overtightening of the nut 34, the inward end 54 of the nut abuts a side wall 56 of the radial flange 17.

From the foregoing it will be appreciated that the coupling 10 of the present invention is capable of securely joining a variety of sizes of flexible conduit while providing a tight fluid seal therebetween. Further, the coupling 10 can be fabricated conveniently and economically of a moldable plastic material, or any suitable metal material, such as brass, and is adaptable for use with substantially any conventional flexible conduit.

While several particular forms of the invention have been illustrated and described, it will also be apparent that various modifications can be made without departing from the spirit and scope of the invention.

We claim:

1. A repair coupling for flexible conduits comprising:
   a body portion including at least one nipple projecting therefrom, said nipple arranged to be received within the end of a flexible conduit;
   a reversible collapsible collet coaxially surrounding said conduit and nipple when said nipple is received within the end of the conduit, and arranged to be disposed in a first position wherein a first means for grippingly engaging said conduit is located on a first end of said collet and cooperates with a first size of conduit, and in a second, oppositely facing, position wherein a second means larger than said first means for grippingly engaging said conduit is located on a second end of said collet and cooperates with a second, larger size of conduit; and
   a retaining nut coaxially surrounding said collet and threadably received on said body portion for collapsing said collet into sealing engagement with the end of said conduit and said conduit into sealing engagement with said nipple when said conduit is received over said nipple.

2. A coupling as defined in claim 1 wherein:
   said nipple includes a plurality of external annular ribs of different outside diameter, the smallest diameter rib being adjacent the distal end of said nipple and the largest diameter rib being adjacent the proximal end of said nipple; and
   said second means for grippingly engaging said second conduit presents, when said collet is in said second position, a larger inside diameter than does said first means when said collet is in said first position.

3. A coupling as defined in claim 1 wherein:
   said collet comprises a hollow generally frustoconical member having a plurality of axial slots disposed alternately at opposite ends thereof, said first means for grippingly engaging said first conduit comprises at least one inwardly facing annular rib; and
   said second means for grippingly engaging said second, larger, conduit comprises at least one inwardly facing annular rib having an inner diameter greater than the inner diameter of said annular rib of said first means.

4. A repair coupling for flexible conduits comprising:
   a body portion having a nipple arranged to be received by the end of a flexible conduit;
   an annular collet disposed over said nipple and sized for coaxially surrounding said nipple and the conduit when said nipple is received within the end of the conduit;
   a retaining nut releasably secured to said body portion and arranged to urge said collet into gripping engagement with said conduit;
   first means on said collet for gripping a first size of conduit when the collet is disposed in a first position; and
   second means on said collet for gripping a second size of conduit when the collet is disposed in a second position in which said collet faces a direction opposite to that in said first position.

5. A coupling as defined in claims 1 or 4 wherein said body portion includes two nipples projecting therefrom in substantially opposite directions.

6. A coupling as defined in claims 1 or 4 wherein said nipple projects from one end of said body portion and a male fitting is disposed at the opposite end of said body portion.

7. A coupling as defined in claims 1 or 4 wherein said nipple projects from one end of said body portion and a female fitting is disposed at the opposite end of said body portion.

8. A coupling as defined in claim 4 wherein said collet is radially collapsible and is urged radially inwardly by said retaining nut to clamp said conduit between said collet and said nipple.

9. A coupling as defined in claim 8 wherein said collet includes a plurality of axial slots disposed alternately at opposite ends thereof.

10. A coupling as defined in claim 3 or 9 wherein said alternately disposed slots overlap one another.

11. A coupling as defined in claim 4 wherein said first and second gripping means are internal annular ribs on said collet.

12. A coupling as defined in claim 4 wherein said collet has a small end and a large end for engaging said first and second sizes of conduit respectively.

13. A coupling as defined in claims 1 or 4 including means on said nipple for engaging the inside surface of said first and second sizes of conduit.

14. A coupling as defined in claim 13 wherein said means for engaging the inside surface of said conduits comprises a plurality of external annular ribs having different outside diameters.

15. A coupling as defined in claim 14 wherein said annular ribs are generally sawtoothed, each having a sharp outer edge on the side thereof nearest said body portion, and said ribs are arranged such that the rib having the smallest outside diameter is adjacent a distal end of said nipple, and the rib having the largest outside diameter is adjacent a proximal end of said nipple.

16. A coupling for repairing flexible conduits comprising:
   a generally cylindrical hollow body portion having external threads adjacent each end thereof;

a pair of nipples on said body portion, one of said nipples projecting coaxially away from one end of said body portion, and the other nipple projecting coaxially away from the other end of said body portion, each of said nipples being arranged to be received within the end of a flexible conduit, and each of said nipples having a plurality of external annular ribs of different outside diameters, the smallest diameter rib being adjacent the distal end of each nipple, and the largest diameter rib being adjacent the proximal end of each nipple;

a reversible, radially collapsible, annular collet coaxially surrounding each of said nipples and conduit when said nipple is received within the end of the conduit, each of said collets being arranged to be disposed in a first position wherein a first means for grippingly engaging said conduit is located on a first end of said collet and cooperates with a first size of conduit, and in a second, oppositely facing position wherein a second means larger than said first means for grippingly engaging said conduit is located on a second end of said collet and cooperates with a second, larger size of conduit; and a retaining nut coaxially surrounding each of said collets, each of said retaining nuts having internal threads at one end for cooperation with said external threads on said body portion, and each of said retaining nuts having an internal tapered bore adjacent the other end for bearing upon an external surface of said collet and radially collapsing said collet to sealingly clamp the end of said conduit between said collet and said nipple when said nipple is received within the end of said conduit.

17. In a repair coupling for flexible conduits including a body portion having a fitting at one end and a tapered nipple at the other end arranged to be tightly received within the end of more than one size of conduit, an annular collapsible collet coaxially surrounding the nipple and conduit when the nipple is received within the end of the conduit, and a retaining nut threadably received on said body portion, coaxially surrounding said collet, and having a tapered internal bore bearing upon an exterior surface of said collet for collapsing said collet radially inwardly to clamp said conduit between said collet and said nipple when the nipple is received within the end of the conduit; the improvement wherein:

said collet comprises a generally frustoconical member having a large end and a small end;

said small end being adapted to engage a first size of conduit when said collet is disposed in a first position, and said large end being adapted to engage a second, larger size of conduit when said collet is disposed in a second, oppositely facing position.

18. The improvement as defined in claim 17 wherein said fitting is an externally threaded male fitting.

19. The improvement as defined in claim 17 wherein said fitting is an internally threaded female fitting.

* * * * *